W. J. WEST.

Improvement in Seed and Guano-Distributors.

No. 130,553.

Patented Aug. 13, 1872.

UNITED STATES PATENT OFFICE.

WILLIAM J. WEST, OF GREENVILLE, SOUTH CAROLINA.

IMPROVEMENT IN SEED AND GUANO DISTRIBUTERS.

Specification forming part of Letters Patent No. 130,553, dated August 13, 1872.

Specification describing a Seed and Guano Distributer, invented by WILLIAM J. WEST, of Greenville, in the county of Greenville and State of South Carolina.

The invention consists in combining, with the hopper, a pendent pivoted shoe, which is provided with a flexible discharge-tube, and shaken by means of pins projecting from opposite sides of a traction-wheel, all as will be hereinafter explained. It consists in a plumb so placed on a seeder as to enable the operator always to know when he has the shoe at the proper inclination.

Figure 1:
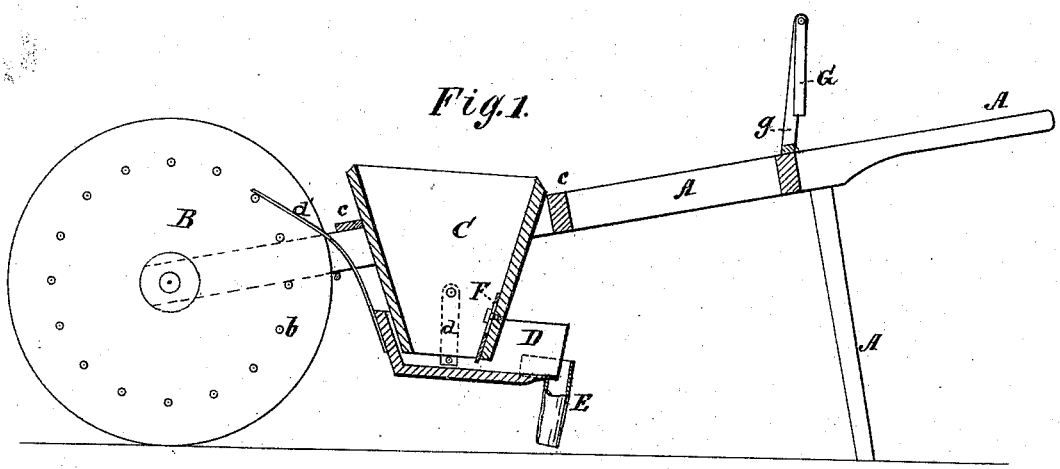
Figure 2:
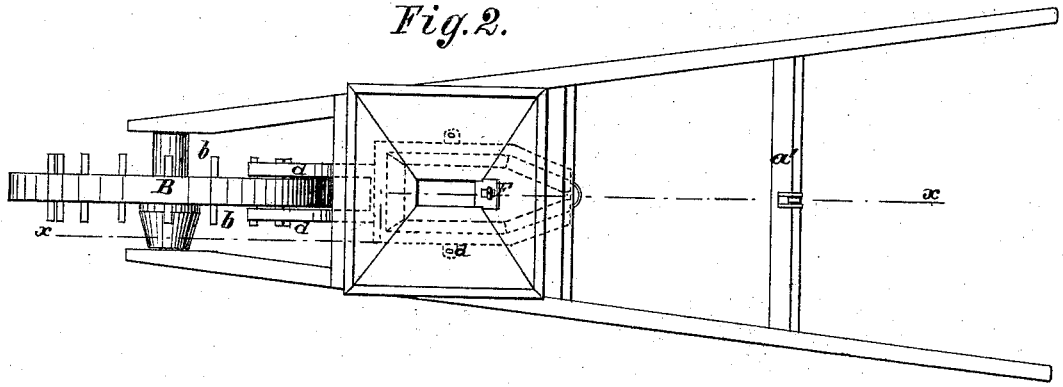

Figure 1 is a longitudinal section, and Fig. 2 a plan view, of my invention.

A is a frame, by which the seeding mechanism is supported and the machine conveniently handled by a single person; B, the wheel, provided with pins, $b$, in a circle on each side face; and C, a bottomless hopper resting in cross-bars $c\ c$ of frame and protruding therethrough. D is the shoe or trough, closed at the upper and converging to a narrow aperture at the lower end. It is pivoted or suspended by straps $d\ d$ to the hopper, and provided at the upper end with fingers $d'\ d'$ that project over, near, and on each side of wheel. E is leather or other tube, arranged at the lower end of shoe, so as to receive therefrom the guano and seed. F is a slotted and vertical sliding gage, which acts in conjunction with shoe to regulate the amount distributed. G is a plumb, pivoted between and near the top of two standards, $g\ g$, on the cross-bar $a'$.

The operation is as follows: The guano and cotton or other seed being placed in the hopper, and the sliding gage F adjusted, the operator lifts the seeder until the plumb G is in line with the standards $g\ g$, and then moves along with the wheel in the previously-made furrow. As the wheel-pins $b$ successively strike the fingers $d'\ d'$ the shoe D is vibrated and a certain portion of guano and seed is shaken out of it and dropped into tube E. This tube, extending nearly to the ground, guides the said guano and seed directly to and drops it exactly on the bottom and middle of furrow, thus avoiding the diffusion of the seed to one or the other side and the subsequent unevenness of the plants in the rows.

Having thus described my invention, what I claim as new, and desire to secure by Letters Patent, is—

1. The vertically-shaking shoe D, suspended from the sides of the hopper C by straps $d\ d$, and provided at its rear and contracted end with a flexible discharge-tube, E, and at its forward end with fingers $d'\ d'$, in combination with the wheel B and pins $b\ b$, the latter projecting from opposite sides of the wheel, all constructed and operating in the manner and for the purpose specified.

2. The plumb G, arranged between standards $g\ g$, and on cross-bar $a'$ of a seeder, as and for the purpose set forth.

WM. J. WEST.

Signed in presence of—
JNO. MCKAY,
N. L. LIPSCOMB.